United States Patent [19]

Darnell et al.

[11] Patent Number: 4,743,630

[45] Date of Patent: May 10, 1988

[54] POLY(ESTER-ETHER-CARBONATE)

[75] Inventors: William R. Darnell, Weber City, Va.;
Winston J. Jackson, Jr., Kingsport, Tenn.

[73] Assignee: Eastman Kodak Company, Rochester, N.Y.

[21] Appl. No.: 892,651

[22] Filed: Aug. 4, 1986

Related U.S. Application Data

[63] Continuation-in-part of Ser. No. 760,801, Jul. 31, 1985, Pat. No. 4,623,675.

[51] Int. Cl.$^4$ ............................................. C08G 63/62
[52] U.S. Cl. .................................... 521/180; 521/182; 521/189; 525/439; 525/462; 528/196; 528/204

[58] Field of Search ................ 525/439, 462; 528/196, 528/204; 521/180, 182, 189

[56] References Cited

U.S. PATENT DOCUMENTS 4,623,675  11/1986  Darnell et al. ..................... 521/180

*Primary Examiner*—Harold D. Anderson
*Attorney, Agent, or Firm*—S. E. Reiter; John F. Stevens; William P. Heath, Jr.

[57] ABSTRACT

Disclosed are new poly(ester-ether-carbonates) which may be prepared by heating aromatic diol polycarbonates and poly(ester-carbonates) with ethylene carbonate, optionally in the presence of a suitable catalyst or promoter.

4 Claims, No Drawings

POLY(ESTER-ETHER-CARBONATE)

This is a continuation-in-part of application Ser. No. 760,801 filed July 31, 1985, now U.S. Pat. No. 4,623,675.

TECHNICAL FIELD

This invention relates to new poly(ester-ether-carbonates) and their preparation by heating aromatic diol polycarbonates and poly(ester-carbonates) with ethylene carbonate, optionally in the presence of a suitable catalyst or promoter.

BACKGROUND OF THE INVENTION

Poly(ether-carbonates) and poly(ester-ether carbonates) have long been prepared by melt polymerization of monomers, which already contained ether linkages, with diphenyl carbonate. Such monomers are generally prepared by reacting ethylene oxide in the presence of a catalyst with a monomeric material containing one or more aromatic hydroxyl groups. The hydroxyl groups are converted to hydroxyethoxyl groups, and thus the monomers containing intraether groups are obtained. During the preparation of the monomer containing the intraether linkages, it is very difficult to carry out the reaction without converting all of the hydroxyl groups to hydroxyethoxyl groups and without some additional reaction with the hydroxyethoxyl groups to form short poly(ethylene oxide) linkages.

The monomers containing intraether groups may be polymerized or copolymerized in the melt with, for example, diphenyl carbonate and/or diphenyl esters of dicarboxylic acids to form poly(ether-carbonates) or poly(ester-ether-carbonates by conventional procedures. Solution polymerization of these monomers with, for example, phosgene or bis(chlorocarbonate)esters of diols, to prepare polymers gives products of relatively low molecular weight.

U.S. Pat. No. 2,628,945 discloses the foaming of fusible, organic macromolecular polymers using ethylene carbonate as a foaming agent. U.S. Pat. No. 3,224,983 discloses the foaming of synthetic thermoplastic polymers containing cyclic carbonate moieties, either chemically combined or admixed in the polymer, by heating in the presence of an "activator."

The preparation of poly(ether-carbonates) by reacting the bis(hydroxyethyl)ethers of aromatic diols with, for example, diphenyl carbonate (and, in some cases, an added diol to prepare copolymers) is well known to those skilled in the art. A homopoly(ether-carbonate) prepared by this method would have the following structure:

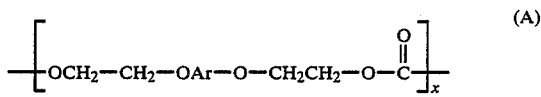

We are aware of no art which discloses the preparation of poly(ether-carbonate) homo- or copolymers from the monohydroxyethyl ether of an aromatic diol. Such a polymer would have the following structure:

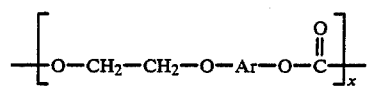

Aqueous alkaline hydrolysis of polymers and analysis of the hydrolysate by gas chromatography is a good method for determining the structure of polymeric materials. When structure (A) is hydrolyzed, the following diol specie is found:

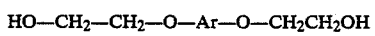

Aqueous alkaline hydrolysis and chromatographic analysis of the hydrolysate of the poly(ethercarbonates) of this invention indicate a mixture of diol moieties are present. For example, when equimolar (one mole/repeat unit) amounts of cyclic ethylene carbonate and bisphenol A polycarbonate are reacted according to the process of this invention, and the polymeric product is hydrolyzed and analyzed by gas chromatography, the diol moieties found are:

| Diol Specie | Mole % (CC) |
| --- | --- |
| HO—⟨⟩—⟨⟩—OH | 35.6 |
| HO—⟨⟩—⟨⟩—O—CH₂CH₂OH | 49.9 |
| HO—CH₂CH₂—O—⟨⟩—⟨⟩—O—CH₂CH₂OH | 14.5 |

Japanese Pat. No. 46-6973 (1971) discloses the preparation of poly(ester-ethers) by reaction of polyesters of aromatic diols with ethylene carbonate, but poly(ester-ether-carbonates) are not disclosed. Also, this patent does not disclose the desirable property of improved solubility which is a characteristic of applicants' invention. Our work indicates poly(ester-ethers) are less soluble in common organic solvents, such as methylene chloride, than are poly(ester-ether-carbonates) at the same level of ether(ethyleneoxy) modification.

It is well known to those skilled in the art that poly(ester-ether-carbonates) can be prepared by heating the bis(2-hydroxyethyl)ether of an aromatic diol or diols with, for instance, diphenyl carbonate and diphenyl terephthalate/isophthalate to eliminate phenol. However, we are not aware of any art which discloses poly(ester-ether-carbonate) compositions containing the moiety derived from the mono-2-hydroxy-ethyl ether of an aromatic diol. Aqueous alkaline hydrolysis of polymers and analysis of the hydrolyzate by gas chromatography is a good method for determining the structure of polymeric materials. Analyses of the aqueous alkaline hydrolyzate of the poly(ester-ether-carbonates) of the invention indicate a substantial amount of the mono-2-hydroxyethyl ether of the aromatic diol.

The present invention provides new poly(ester-ether-carbonate) compositions. The present invention also provides a process for preparing these polymers and a process for foaming aromatic diol polycarbonates and poly(ester-carbonates). The objects of the invention are accomplished by heating an aromatic diol polycarbonate or poly(ester-carbonate) with ethylene carbonate at about 160° C. up to about 300° C. (partial pressurization required to prevent loss of ethylene carbonate at high temperatures) for up to 5-6 hours, optionally in the presence of a suitable catalyst. The reaction may be represented as follows:

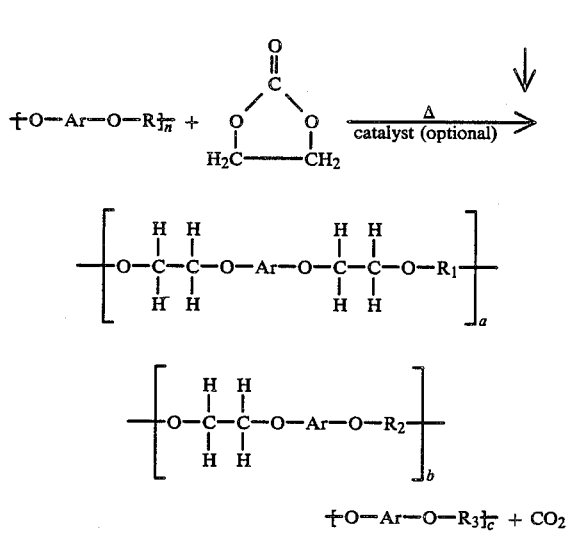

wherein $a+b+c=n$ and are not blocked as depicted but are randomly repeated, Ar is defined as aryl having 6–30 carbon atoms, R, $R_1$, $R_2$ and $R_3$ are each

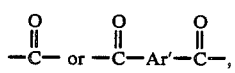

wherein Ar' is aryl of 8 to 16 carbon atoms, and

is present in amounts of greater than 0 to less than 100% and

is present in amounts of more than 0 to less than 100%.

According to the present invention, there is provided a composition of matter comprising repeating units of:

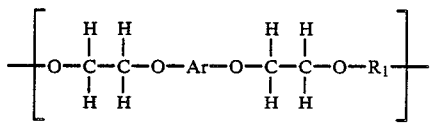

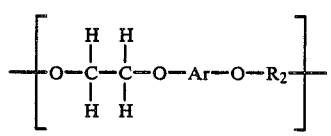

and

such as to result in an I.V. of about 0.05–2.00 of said composition and Ar, $R_1$, $R_2$, $R_3$ and Ar' are as defined above.

In the particular embodiment claimed in the present invention, R is a mixture of greater than 0 to less than 100%

and greater than 0 to less than 100%

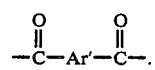

In applicants' copending application Ser. No. 760,801 filed 7/31/86, R is 100%

In Japanese Pat. No. 46-6973 (1971) insofar as it relates to this invention, R is 100%

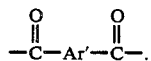

However, it is not disclosed in this Japanese patent that R may be

When R is

or at least sometimes

certain advantages such as lower Tg and melt viscosity (therefore improved processability) and improved solubility in common solvents are realized. Thus, compositions containing repeating units (2) above wherein R is at least sometimes

are believed to be novel.

This invention also provides foamed structures, films, and fibers comprising the compositions described above. The new compositions of this invention provide molded products of good stiffness characteristics, higher elongation, good solubility, and processability is improved due to lower melting temperatures and lower glass transition temperature.

In the composition described structurally above, a, b, and c are at least 1 and usually 2 or more. The integers a, b, and c may range upwardly to result in molecular weights of processable compositions. When a, b, and c are too large, the compositions are not processable, because the molecular weights are so high as not to permit melting or dissolving. When a, b, and c are small, i.e., about 1, the compositions are useful as polyols for forming coating compositions. The terminal groups are hydroxy groups.

The I.V. (inherent viscosity) of the compositions may range from about 0.05 to about 2.00, preferably about 0.1 to about 0.7.

Ar may be substituted or unsubstituted. Conventional substituents may be used, e.g., alkylene, alkyl, aralkyl, or aryl group of 1 to 24 carbon atoms, halogen, etc.

The polymers of the invention are prepared by heating a mixture of an aromatic (as defined above) diol polycarbonate, poly(ester-carbonate) or copolymers thereof with ethylene carbonate at about 160° C. up to about 300° C. for a few seconds to 2-3 hours or more, depending on the molar ratio of ethylene carbonate/polycarbonate or poly(ester-carbonate), the melting or flow point thereof, the thermal stability thereof, and the circumstances or method of carrying out the reaction. The molar ratio of ethylene carbonate:polycarbonate or poly(ester-carbonate) may be about 0.005-1.9:1. However, where a foamed product is to be made, the ratio should be about 0.005-0.04:1. Excess ethylene carbonate (above 1.9:1 up to about 5:1) may be used in the process, but the excess ethylene carbonate above the 1.9:1 ratio must be removed, such as by vacuum distillation, before polymerization is completed. The excess ethylene carbonate in such a case would act as a solvent. Higher molar ratios require shorter reaction times. If the melting or flow point of the polymer is high, obviously longer reaction times will be required unless the reaction temperature is increased. Optionally, a catalyst may be added to increase the rate of the reaction. The reaction is usually carried out at or slightly below the boiling point of ethylene carbonate (248° C.), but the reaction may be carried out at higher temperatures under pressure to prevent loss of ethylene carbonate. In general, the time of reaction varies indirectly with the molar ratio of ethylene carbonate/polycarbonate or poly(ester-carbonate) and the reaction temperature. The reaction may be carried out in a batch or continuous reactor (used with higher molar ratios of ethylene carbonate/polycarbonate or polyester-carbonate in which a foamed product is not desired), an extruder (for extruded shapes in which the carbon dioxide by-product of the reaction is utilized as a blowing agent), or an injection molding machine (for molded shapes in which the carbon dioxide by-product of the reaction is utilized as the blowing agent). Conventional extrusion-foaming and foam molding equipment may be used. Generally, extrusion foaming and foam molding operations are carried out at relatively low molar ratios of ethylene carbonate/polycarbonate or polyester carbonate (about 0.005 to about 0.04), since the amount of by-product carbon dioxide needed for these processes is small. Density reductions of 40–50% or more can be achieved at molar ratios of about 0.01/1–0.02/1.

For those instances in which an unfoamed product is desired, the reaction is carried out in a batch or continuous reactor under conditions which will allow the by-product carbon dioxide to escape without causing the reaction mixture to foam out of the reactor. Generally, the reaction is carried out until the theoretical volume of carbon dioxide has been evolved, and vacuum is applied for a short period to remove volatile materials. If the presence of small amounts of volatiles is acceptable, application of vacuum is not required to obtain useful polymers.

Since the rate of reaction is considerably dependent on the molar ratio of ethylene carbonate/polycarbonate or polyester-carbonate (faster rates at higher ratios), it is at times advantageous to begin the reaction at a higher than desired molar ratio of ethylene carbonate/polycarbonate or polyester-carbonate and apply vacuum to remove the excess ethylene carbonate when the desired theoretical volume of carbon dioxide has been evolved. This is especially true when polymers having high flow points or excessively high melt viscosities are utilized in the reaction. In such cases, molar ratios of up to 5 or more may be used in the starting reactants, but the ratio in the polymeric mixture must be no greater than 1.9:1 (ethyleneoxy:repeat unit of aromatic diol). The poly(ester-ether-carbonate) compositions of the invention contain 0.005–1.9 moles of ethyleneoxy(—O—CH$_2$—CH$_2$—) per repeat unit of aromatic diol polycarbonate or polyester-carbonate. The polymers containing low levels of ethyleneoxy are usually foamed compositions.

Although the reaction proceeds readily in the absence of added catalyst, it may at times be advantageous to add a catalyst or promoter to the reaction to increase the rate of reaction, particularly at relatively low molar ratios of ethylene carbonate/polycarbonate. Suitable catalysts and promoters include tertiary amines, quaternary ammonium and phosphonium salts, alkali metal salts, and compounds or polymers containing at least one unsubstituted amide hydrogen atom:

Aromatic diol polycarbonates which may be used to prepare the new compositions of the invention include all aromatic diol polycarbonates or copolycarbonates which are sufficiently thermally stable to withstand the conditions of the reaction and which are molten or substantially dissolved during the process. Aromatic diol, in this case, refers to any moiety to which are attached, directly to an aromatic ring, two hydroxyl groups. The hydroxyl groups may be on the same or different rings. The preferred polycarbonate is bisphenol A polycarbonate. The aromatic diol polycarbonates may be high or low I.V. The I.V. of the final polymer is usually somewhat lower than that of the aromatic diol polycarbonate. The I.V. of the aromatic diol polycarbonate should be about 0.05–0.2 if the poly(ether carbonate) product is to be used as a polyol. If the poly(ether carbonate) product is to be used as a molding plastic, the I.V. of the aromatic diol polycarbonate should be greater than 0.2, and preferably greater than 0.5.

Aromatic diol poly(ester-carbonates) which may be used to prepare the new compositions of the invention include all aromatic diol or copoly(ester-carbonates) which are sufficiently thermally stable to withstand the conditions of the reaction and which are molten or substantially dissolved during the process. They may contain greater than 0 to less than 100 mol % carbonate linkage and greater than 0 to less than 100 mol % moieties derived from at least one aromatic dicarboxylic acid containing 8–10 carbon atoms. Examples of suitable aromatic dicarboxylic acids include terphthalic, isophthalic, 2,6-naphthalenedicarboxylic, 4,4'-oxydibenzoic, 4,4'-biphenyldicarboxylic, and 4,4'-sulfonyldibenzoic acids. The aromatic diol poly(ester-carbonates) may be high or low I.V., but I.V.'s of about 0.3 to about 0.8 are preferred. Aromatic diol, in this case, refers to any moiety to which they are attached, directly to an aromatic ring, two hydroxyl groups. The hydroxyl groups may be on the same or differnt rings. The preferred poly(ester-carbonates) of the invention contain, in addition to the carbonate, bisphenol A, terephthalate, and isophthalate moieties.

The new polymers of the invention have utility as fibers, molding plastics, and films. They exhibit improved processability (due to depression of the glass transition temperature) and improved solubility in common solvents while maintaining high flexural moduli, relative to their aromatic diol polycarbonate or poly(ester-carbonate) precursors.

If desired, inert additives such as nucleating agents may be added before reaction of the ethylene carbonate with the aromatic diol polycarbonate or polyester-carbonate, particularly when the polymer is to be extrusion foamed or foam molded.

The following examples are submitted for a better understanding of the invention. Inherent viscosities of the polymers are determined at 25° C. in a 40/25/35 weight mixture of p-chlorophenol/phenol/1,1,2,2-tetrachloroethane at a concentration of 0.1 g/100 mL. Films are pressed in a Hannafin press at 10°–30° C. above the melting or flow point of the poly(ether-carbonate) or poly(ester-ether-carbonate). H NMR data are obtained with a JEOL JNM-MH-100 nuclear magnetic spectrometer using d-trifluoroacetic acid as a solvent.

Foamed moldings are carried out in a Newbury molding machine by the "short-shot" procedure, and unfoamed moldings are carried out in a Watson-Stillman (⅜-ounce) molding machine. For gas chromatographic analysis, the samples are first hydrolyzed in 1N KOH in n-propanol. The hydrolysate is then silated and separated on a column containing 10% silicone F-50 at 100°–240° C. Glass transition temperatures (Tg's) are determined with a Perkin-Elmer DSC-2 differential scanning calorimeter. For determining the properties of molded specimens, ASTM D638 is used for tensile properties, ASTM D790 is used for flexural properties, and ASTM D955 is used for heat-deflection temperature.

EXAMPLE 1

This sample illustrates the preparation and molding plastic properties of a poly(ether-carbonate) prepared from ethylene carbonate/bisphenol A polycarbonate at a starting molar ratio of 1/1.

Into a 500-mL, three-necked flask equipped with metal stirrer, provisions for maintaining a nitrogen atmosphere and applying vacuum, and a wet test meter to measure the volume of gas evolved are placed 139.7 g (0.55 mol) bisphenol A polycarbonate, I.V. 0.64, and 48.4 g (0.55 mol) of distilled cyclic ethylene carbonate. After being purged three times with nitrogen, the contents of the flask are dried in a 100° C. metal bath for 30 minutes at 10 torr. The flask is then heated in a metal bath at 250° C. for 45 minutes with slow stirring. During this time, the reaction mixture becomes homogeneous, a light yellow color forms, and 0.082 ft³ of gas is liberated. The metal bath temperature is then raised to 260° C. for 80 minutes. At this time, the total amount of gas liberated is 0.285 ft³. The metal bath temperature is further increased to 275° C. for 150 minutes, and the total amount of liberated gas is now 0.388 ft³, or 0.43 mol of $CO_2$. Vacuum is then applied to the stirred flask during about five minutes to <0.5 torr, and the reaction is stirred at this temperature and pressure for 15 minutes and cooled. The hot polymer is transparent, light yellow, has a moderate melt viscosity, and weighs 160.1 g. The poly(ether-carbonate) has an I.V. of 0.61 and a Tg of 104° C. By NMR, the molar ratio of ethyleneoxy/bishphenol A units in the poly(ether-carbonate) is 0.8/1. Hydrolysis of the poly(ether-carbonate) product and analysis of the hydrolysate by gas chromatography indicates the following diol moieties and concentrations are present in the poly(ether-carbonate):

| Diol Specie | Mole % (CC) |
|---|---|
| 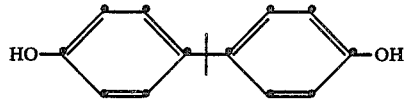 | 36.0 |
|  | 50.2 |
| 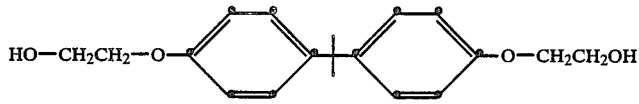 | 13.8 |

The poly(ether carbonate) is then Wiley-milled through a ¼-inch screen, vacuum dried at 80° C. overnight, and injection molded at 260° C./900 psig in a Watson-Stillman molding machine (½-ounce). The molded bars are transparent and light yellow. A sample of the bisphenol A polycarbonate which was used to prepare the poly(ether-carbonate) is also molded as a control at 290° C./1200 psig. Comparative properties are given below.

| Property | Polycarbonate Control | Poly(ether carbonate) |
|---|---|---|
| Tensile strength, psi | 11,370 | 9,350 |
| Elongation at Break, % | 77 | 109 |
| Flexural Strength, psi | 13,480 | 15,420 |
| Flexural Modulus, psi | 336,000 | 406,000 |
| Heat Deflection Temperature °C. 264 psi | 129 | 87 |

EXAMPLE 2

This example illustrates the preparation of the Example 1 poly(ethyl-carbonate) without the application of vacuum.

Example 1 is repeated except the reaction is stopped after five hours total heating without vacuum. The melt viscosity of the reaction mixture at no time decreases below a moderate level. The light yellow polymer has an I.V. of 0.50 and gives a very tough pressed film. NMR analysis indicates the molar ratio of ethyleneoxy/bisphenol A units is 0.96/1. Gas chromatographic analysis indicates the poly(ether-carbonate) contains the following:

| Diol Specie | Mole % (CC) |
|---|---|
| 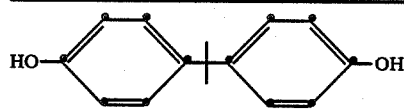 | 42.0 |
| 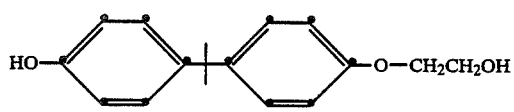 | 43.4 |
| 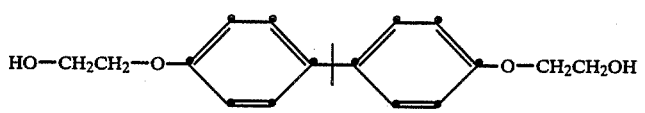 | 14.6 |

EXAMPLE 3

This example illustrates the preparation of a poly(ether-carbonate) containing the maximum ratio of ethyleneoxy/bisphenol A units.

Into a 500-mL, three-necked flask equipped as described in Example 1 are placed 50.8 g (0.20 mol) bisphenol A polycarbonate and 35.2 g (0.40 mol) of cyclic ethylene carbonate. (Both starting materials are the same as those of Example 1.) After being purged and dried as described in Example 1, the flask is heated with stirring at 245° C. for 200 minutes to liberate 0.347 ft³, or 0.39 mol of $CO_2$. At this time, vacuum is applied at 245° C. to <0.5 torr during about 35 minutes and heating is continued for 30 minutes and stopped. The light yellow, transparent polymer has an I.V. of 0.59 and gives a tough pressed film. NMR analysis indicates the molar ratio of ethyleneoxy/bisphenol A units in the polymer is 1.9/1.

EXAMPLE 4

This example illustrates the simultaneous preparation and foam molding of a poly(ether-carbonate) from ethylene carbonate/bisphenol A polycarbonate at a 0.014/1 molar ratio.

Into a vacuum oven are placed 564.7 g (2.223 mol) of bisphenol A polycarbonate pellets, I.V. 0.64. The polycarbonate pellets are then vacuum dried at 70° C./45 hours/<0.5 torr and transferred while hot to a glass bottle (preheated to about 75° C.). At this time, 2.84 g (0.032 mol) of freshly distilled, granular cyclic ethylene carbonate are added to the warm bottle; the bottle is capped under nitrogen; and the bottle is shaken and tumbled vigorously for 5-10 minutes to effect mixing (melt coating) of the ethylene carbonate with the polycarbonate. The molar ratio of ethylene carbonate/polycarbonate is 0.014/1. The blend is then injection foam molded at 300° C. and one minute cycle time by the "short-shot" method into ½×½×5-inch bars in a water-cooled mold in a Newbury molding machine. The bars are very slightly yellow and contain a substantial amount of small-cell foam structure. The bars have an I.V. of 0.58, and the density as measured by a null pycnometer is 0.710, which indicates a density reduction of 41%.

EXAMPLE 5

This example illustrates the preparation of a poly(ether-carbonate) from an aromatic diol polycarbonate in which both hydroxyl groups of the diol are on the same ring.

Into a 250-mL, single-necked flask equipped as described in Example 1 are placed 15.9 g (0.075 mol) 2-phenylhydroquinone polycarbonate, I.V. 0.59, and 6.6 g (0.075 mol) of distilled cyclic ethylene carbonate. After being purged and dried as described in Example 1, the flask is immersed in a metal bath maintained at 250° C. and slowly stirred for 60 minutes. During this time, the reaction mixture becomes homogeneous, a yellow color forms in the reaction mixture, and 0.013 ft³ of gas are liberated. The metal bath temperature is then raised to 260° C. for 100 minutes and finally to 275° C. for 166 minutes. At this time, the total of liberated gas is 0.053 (0.059 mol of $CO_2$) and vacuum is applied during six minutes to <0.5 torr. The flask is slowly stirred under these conditions for an additional 18 minutes and cooled. The poly(ether-carbonate) has an I.V. of 0.50 and gives a clear, tough pressed film. NMR analysis indicates the molar ratio of ethyleneoxy/phenylhydroquinone units in the poly(ether-carbonate) is 0.78/1.

In the following examples, the poly(ester-carbonate) used is a commercial product of General Electric Company, Lexan 3250, and is approximately a 60/10/30 copoly(terephthalate/isophthalate/carbonate) of bisphenol A. The polyester used is a commercial product of Union Carbide Chemical Company, Ardel D-100, and is approximately a 50/50 copolytere/isophthalate of bisphenol A.

EXAMPLE 6

This example illustrates the preparation and solubility characteristics of a poly(ester-ether-carbonate) containing about 0.10 mole of ethyleneoxy moiety per repeat unit of poly(ester-ether-carbonate).

A 1000-mL, 3-necked flask is equipped with a stirrer, provisions for maintaining a nitrogen atmosphere and applying vacuum, and a reflux condenser attached to a Dean-Starke trap. To the flask is then added 42.24 g (0.48 mole) of distilled ethylene carbonate and 80 mL of toluene (dried over molecular sieve). The flask is then heated by means of a metal bath maintained at 140° C. with stirring at reflux for about one hour to remove any water from the ethylene carbonate. The toluene is then allowed to distill away into the Dean-Starke trap during about 1-1.5 hours. The metal bath temperature is then increased to 250° C. and 196.20 g. (0.60 mole) of Lexan 3250 poly(ester-carbonate) pellets (I.V. 0.57) (vacuum-dried for 24 hr. at 100° C. and 20 in. of Hg) are added. (The system outlet is immediately attached to a wet tester meter to measure the amount of carbon dioxide evolved.) After being stirred for 40 minutes, the Lexan 3250 is completely dissolved, and 0.051 cubic feet of carbon dioxide have been evolved. At this time, the metal bath temperature is increased to 260° C. for 5 additional minutes to give 0.054 cubic feet of $CO_2$ evolved (theory for 0.1/1 ethyleneoxy/Lexan 3250 repeat unit is 0.054 cubic feet of $CO_2$). To remove the excess ethylene carbonate, vacuum is then applied, and the pressure is reduced to <0.5 torr during 15 minutes. During this period, the melt viscosity increases substantially. The flask is stirred at 260° C. for an additional 25 minutes and then at 270° C. for 60 minutes and cooled. The product is very slightly colored, has an I.V. of 0.53, and is soluble in methylene chloride at 20 w/w %. A sample of the starting Lexan 3250 does not dissolve in methylene chloride at 20 w/w %.

EXAMPLE 7

This example illustrates the preparation of a poly(ester-ether-carbonate) containing about 1.9 moles of the ethyleneoxy moiety per repeat unit of poly(ester-ether-carbonate).

132.00 g (1.5 mole) of ethylene carbonate are charged to a 100-mL, 3-necked flask equipped as described in Example 1 and 80 mL of toluene are added. The ethylene carbonate is azeotropically dried as in Example 1, and the toluene is distilled away. 196.20 g (0.60 mole) of Lexan 3250 pellets (I.V. 0.57) (dried as in Example 1) are then added, the wet test meter is attached to the system outlet, and the flask is stirred at 250° C. while the amount of carbon dioxide evolved is monitored. A uniform reaction mixture is evident after 20 minutes and 0.30 cubic feet of carbon dioxide have been evolved. After 27 additional minutes, 0.80 cubic feet of carbon dioxide have been evolved, and the metal bath temperature is increased to 260° C. After 20 minutes at 260° C., 1.02 cubic feet of carbon dioxide have been evolved, and vacuum is applied to remove the excess ethylene carbonate. (The theoretical amount of carbon dioxide for a 1.9/1 ratio of ethyleneoxy/repeat unit of poly(ester-ether-carbonate) is 1.02 cubic feet.) Full vacuum (<0.5 torr) is attained in 8 minutes. The reaction is continued for 55 additional minutes and cooled. The slightly colored product has an I.V. of 0.51 and is soluble at 40 wt/wt % in methylene chloride.

EXAMPLE 8

This example illustrates the preparation and relative solubilities of a poly(ester-ether) of the prior art and a poly(ester-ether-carbonate) of the invention at the same levels of ethyleneoxy modification. The more ether-(ethyleneoxy) put in the composition, the better the solubility; therefore, comparison is made at the same level of modification.

Poly(ester-ether): 1/1 ethyleneoxy/repeat unit 79.20 g (0.90 mole) ethylene carbonate and 80 mL of toluene are charged to a 1000-mL, 3-necked flask equipped as described in Example 1, and the water is azeotropically removed. The toluene is allowed to distill away, and the metal bath temperature is increased to 250° C. 214.80 g (0.60 mole) of the polyarylate (Ardel D-100) (I.V. 0.67) (vacuum dried at 100° C./0.5 torr overnight) is then added, the wet test meter is attached to the system outlet, and stirring is begun. After being stirred for 12 minutes, the reaction mixture is uniform, and 0.404 cubic feet of carbon dioxide have been evolved. After an additional 5 minutes, 0.535 cubic feet of carbon dioxide have been evolved, and vacuum is applied to remove the excess ethylene carbonate. (Theoretical carbon dioxide for 1/1 ethyleneoxy/polymer repeat unit is 0.536 cubic feet.) Full vacuum is achieved during about 3 minutes, and the reaction is continued for 68 minutes and cooled. The amber product has an I.V. of 0.65 and is not completely soluble in methylene chloride at 30 w/w %.

Poly(ester-ether-carbonate): 1/1 ethyleneoxy/repeat unit 79.20 g (0.90 mole) of ethylene carbonate and 80 Ml of toluene are placed in a 1000-mL, 3-necked flask equipped as described in Example 1, and the water and toluene are removed as described above. After the metal bath temperature is increased to 250° C., 196.20 g (0.60 mole) of Lexan 3250 (I.V. 0.57) (vacuum-dried as above) are added, the wet test meter is attached to the system outlet, and stirring is begun. After being stirred for 28 minutes, the reaction mixture is uniform, and 0.116 cubic feet of carbon dioxide have been evolved. Twenty minutes later, the metal bath temperature is increased to 260° C., and 0.198 cubic feet of carbon dioxide have been evolved. The reaction is continued for 52 minutes to evolve a total of 0.536 cubic feet of carbon dioxide. Vacuum is applied at this time to remove the excess ethylene carbonate. Full vacuum (<0.5 torr) is achieved in 6 minutes. The reaction is continued with stirring under vacuum for 32 minutes and cooled. The slightly colored product has an I.V. of 0.52 and is readily soluble in methylene chloride, even at 40 w/w %.

Unless otherwise specificed, all parts, percentages, ratios, etc., are by weight.

The invention has been described in detail with particular reference to preferred embodiments thereof, but it will be understood that variations and modifications can be effected within the spirit and scope of the invention.

We claim:

1. A composition of matter comprising a mixture of the following repeating units:

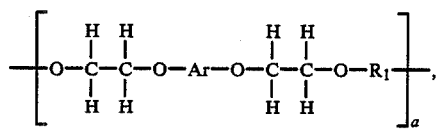 (1)

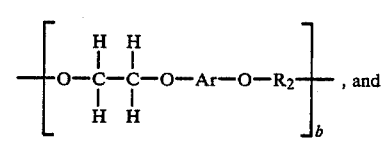, and (2)

 (3)

wherein a, b, and c are each integers of a magnitude such as to result in an inherent viscosity of said composition of about 0.05–2.00, wherein said inherent viscosity is determined at 25° C. in a 40/25/35 weight mixture of p-chlorophenol/phenol/1,1,2,2-tetrachloroethane at a concentration of 0.1 g/100 mL; Ar is arylene having 6–30 carbon atoms; $R_1$, $R_2$, and $R_3$ are each

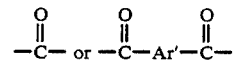

wherein Ar' is arylene of 6–16 carbon atoms; and

is present in amounts of greater than 0 to less than 100% and

is present in amounts of greater than 0 to less than 100%, with the proviso that $R_2$ is

or a mixture of

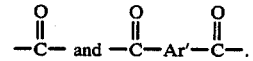.

2. A foamed structure comprising the composition of claim 1.
3. A film comprising the composition of claim 1.
4. A fiber comprising the composition of claim 1.

* * * * *

UNITED STATES PATENT AND TRADEMARK OFFICE
CERTIFICATE OF CORRECTION

PATENT NO. : 4,743,630
DATED : May 10, 1988
INVENTOR(S) : William R. Darnell and Winston J. Jackson, Jr.

It is certified that error appears in the above-identified patent and that said Letters Patent is hereby corrected as shown below:

Title page Item (54) should read

——POLY(ESTER–ETHER–CARBONATES)——.

Column 1, line 2, the heading should read

——POLY(ESTER–ETHER–CARBONATES)——.

Column 7, line 9, delete "or".

Column 8, line 17, delete "sample" and insert ——example——.

Column 11, line 35, delete "tester" and insert ——test——.

Signed and Sealed this

Twentieth Day of December, 1988

Attest:

DONALD J. QUIGG

Attesting Officer

Commissioner of Patents and Trademarks